United States Patent [19]
Wanngård

[11] Patent Number: 5,961,948
[45] Date of Patent: Oct. 5, 1999

[54] METHOD OF PRODUCING HYDROGEN PEROXIDE

[75] Inventor: Johan Wanngård, Angered, Sweden

[73] Assignee: EKA Chemicals AB, Bohus, Sweden

[21] Appl. No.: 08/881,286

[22] Filed: Jun. 24, 1997

[51] Int. Cl.⁶ .................................................. C01B 15/01
[52] U.S. Cl. ................... 423/584; 502/182; 502/185; 502/243; 502/261; 502/262; 502/330; 502/332; 502/333; 502/334; 502/344
[58] Field of Search ............................. 502/185; 423/584

[56] References Cited

U.S. PATENT DOCUMENTS

| | | | |
|---|---|---|---|
| 3,361,533 | 1/1968 | Hooper . | |
| 4,007,256 | 2/1977 | Kim et al. ............................ | 423/584 |
| 4,681,751 | 7/1987 | Gosser . | |
| 4,772,458 | 9/1988 | Gosser et al. . | |
| 5,061,671 | 10/1991 | Kitson et al. ......................... | 502/185 |
| 5,082,647 | 1/1992 | Chuang ................................. | 423/584 |
| 5,110,779 | 5/1992 | Hucul .................................... | 502/185 |
| 5,128,114 | 7/1992 | Schwartz . | |
| 5,338,531 | 8/1994 | Chuang et al. . | |
| 5,531,976 | 7/1996 | Decker, Jr. et al. ................. | 423/628 |
| 5,593,654 | 1/1997 | Decker, Jr. et al. ................. | 423/628 |
| 5,772,977 | 6/1998 | Jenkins et al. ....................... | 423/588 |

FOREIGN PATENT DOCUMENTS

| | | |
|---|---|---|
| 0 117 306 | 9/1984 | European Pat. Off. . |
| 0 132 294 | 1/1985 | European Pat. Off. . |
| 0 366 419 | 5/1990 | European Pat. Off. . |
| 92 04976 | 4/1992 | WIPO . |
| WO 93/14025 | 7/1993 | WIPO . |

OTHER PUBLICATIONS

EPO Patent Application No. 0 627 381 A1, "Process for Producing Hydrogen Peroxide" filed Nov. 16, 1993, published Dec. 7, 1994.

Fu et al. "Selective Oxidation of Hydrogen to Hydrogen Peroxide" *Studies in Surface Science and Catalysis*, vol. 72 pp. 33–41, 1992.

*Primary Examiner*—Wayne Langel
*Attorney, Agent, or Firm*—McDermott, Will & Emery

[57] ABSTRACT

The invention relates to a method of producing hydrogen peroxide by direct reaction between hydrogen and oxygen in an aqueous reaction medium, in which method hydrogen and oxygen are contacted with a catalyst suspended into the reaction medium, and the catalyst is a catalytically active surface material deposited on a support of porous silica, alumina or non-fluorinated carbon having a BET surface less than about 150 m²/g, wherein pores with a diameter exceeding about 10 nm constitute more than about 50% of the total pore volume. The invention also relates to a catalyst useful in the claimed method.

10 Claims, No Drawings

METHOD OF PRODUCING HYDROGEN PEROXIDE

The present invention relates to a method of producing hydrogen peroxide by direct reaction of hydrogen and oxygen in an aqueous medium in the presence of a catalyst. The invention also relates to a catalyst suitable for use in such a method.

Production of hydrogen peroxide by direct reaction between hydrogen and oxygen can be performed by contacting hydrogen and oxygen with a catalyst in an aqueous reaction medium as described in, for example, the U.S. Pat. Nos. 4,681,751, 4,772,458, and 5,128,114, and EP 627381.

However, it is hard to obtain high concentrations of hydrogen peroxide which is assumed to be due to the fact that the same catalyst that promotes formation of hydrogen peroxide also catalyses its decomposition into water and oxygen.

In order to obtain a selective catalyst the U.S. Pat. No. 5,338,531 and Chuang et al, "Selective Oxidation of Hydrogen to Hydrogen Peroxide", Studies in Surface Science and Catsysis, Vol. 72, pp 33–41 disclose use of a palladium catalyst on support of fluorinated carbon. Such supports are, however, comparatively expensive and may also cause problems with foaming, cladding and formation of dry deposits in the reactor.

It is an object of the present invention to solve the problem of providing a process of producing hydrogen peroxide directly from hydrogen and oxygen with high selectivity, thus enabling preparation of aqueous solutions of hydrogen peroxide at high concentrations. It is another object of the invention to provide a selective catalyst suitable for such a process.

In catalytic processes it is generally considered favourable to use a catalyst with a large active surface which can be provided by depositing the active material on a porous support of, for example, adsorbent carbon. However, it has now surprisingly been found that the selectivity of a catalyst for preparation of hydrogen peroxide can be improved if the active material is deposited on a porous support which is hydrophilic, has a comparatively small surface area and mainly having pores with a comparatively large diameter.

Thus, the present invention relates to a method of producing hydrogen peroxide by direct reaction between hydrogen and oxygen in an aqueous reaction medium. The hydrogen and the oxygen are contacted with a catalyst suspended in the reaction medium, the catalyst comprising a catalytically active material deposited on a support of porous silica, alumina or non-fluorinated carbon having a BET surface less than about 150 $m^2/g$, wherein pores with a diameter exceeding about 10 nm constitutes more than about 50% of the total pore volume.

The invention also relates to a catalyst suitable for use in such a process, which catalyst comprises a catalytically active material deposited on a support of porous silica, alumina or non-fluorinated carbon having a BET surface less than about 150 $m^2/g$, wherein pores with a diameter exceeding about 10 nm constitutes more than about 50% of the total pore volume.

The most preferred support material is non-fluorinated carbon, particularly carbon black.

The support material is preferably not hydrophobic and it is particularly preferred if the catalyst is in the form of particles sinking in water.

The BET surface area of catalyst support is preferably less than about 120 $m^2/g$, most preferably less than about 100 $m^2/g$, but does preferably exceed about 10 $m^2/g$, most preferably about 20 $m^2/g$. Preferably pores with a diameter exceeding about 10 nm, most preferably exceeding about 20 nm constitutes more than about 50%, most preferably about 80% of the total pore volume.

Without being bound to any specific theory, it is assumed that low specific surface area and a low amount of small pores minimizes accumulation of hydrogen peroxide in the catalyst where there is a deficiency of hydrogen which inevitably leads to its decomposition to form water. Such accumulation may also lead to dissolution of the catalytically active material. Further, it is assumed that carbon as such promotes decomposition of hydrogen peroxide, which decomposition can be minimized by using a support with a small specific surface.

In catalytic processes it is generally considered favourable if the active material is deposited on the support in the form of as small particles as possible, thus maximizing the active surface of the catalyst. However, according to the present invention it has been found tat fairly large particles of the active material does not result in any substantial loss in productivity, but may involve higher stability of the catalyst. The particle size can be expressed as the surface area of the active material which suitably is from about 25 to about 500 $m^2/g$ active material, preferably from about 30 to about 100 $m^2/g$ active material.

The catalyst is preferably in the form of particles with an average diameter from about 1 to about 100 $\mu$m, most preferably from about 5 to about 50 $\mu$m or from about 20 to about 50 $\mu$m.

Preferably the catalyst contains from about 0.1 to about 10% by weight, most preferably from about 0.3 to about 8% by weight of the catalytically active material. The catalyst can be prepared by impregnating a support with a solution or a colloid of the active material as described in, for example, U.S. Pat. No. 5,338,531.

The catalytically active material suitably comprises one or more precious metals, preferably selected from group VIII metals or gold, most preferably palladium, platinum or mixtures thereof. Most preferably the active material is a mixture of from about 90 to 100% by weight of palladium and from 0 to about 10% by weight of platinum.

The aqueous reaction medium is suitably acidic and does preferably contain from about 0.01 to about 1 moles/liter of free hydrogen ions, most preferably from about 0.02 to about 0.2 moles/liter of free hydrogen ions. The acid may for example be supplied in the form of sulfuric acid, phosphorous acid or perchloric acid which preferably is present in an amount from about 0.01 to about 1 mole/liter, most preferably from about 0.02 to about 0.2 moles/liter. Further, the reaction medium also suitably contains one or several halide ions such as bromide, chloride, or iodide, of which bromide being particularly preferred. The halogenide is preferably present in an amount from about 1 to about 1000 ppm by weight, most preferably from about 2 to about 100 ppm by weight, and may be supplied in the form of alkali metal salts such as sodium, potassium or mixtures thereof or as the corresponding acids.

The process is suitably carried out by continuously feeding hydrogen and oxygen in gas form to a pressurised reaction vessel containing a slurry of catalyst particles in the reaction medium. The oxygen may be supplied as substantially pure gas or in the form of an oxygen containing gas such as air. The gas phase in the reactor suitably contains an excess of oxygen, preferably from 0 to about 75 mol % or from 0 to about 25 mol %. The reaction is favoured by a high content of hydrogen, suitably above about 0.1 mol %, preferably above about 1 mol %, but for safety reasons it is preferred not to exceed the detonation limit at about 19 mol % and most preferred not to exceed the explosion limit at about 5 mol %. The pressure is suitably maintained from about 10 to about 200 bars, preferably from about 30 to about 100 bars, while the temperature suitably is maintained from about 0 to about 100° C., preferably from about 20 to about 70° C. In order to achieve sufficient mass transport it is preferred that the reaction medium is agitated or pumped around, or that the gas is injected in the bottom of the reaction vessel. The hydrogen peroxide formed dissolves in the reaction medium which continuously is withdrawn from the reaction vessel through a filter on which the catalyst is retained. The hydrogen peroxide can be separated from the reaction medium with conventional unit operations such as evaporation, distillation or combinations thereof. The reaction medium can then be recycled to the reaction vessel, optionally after addition of make up chemicals such as sulfuric acid, alkali metal bromide etc.

An embodiment of the invention is further described through the following Example, which however not should be interpreted as limiting the scope of the invention. If not otherwise stated all contents and percentages refer to parts or percent by weight.

EXAMPLE

Catalysts according to the invention containing 3% by weight of Pd were prepared by impregnating carbon black support particles (Elftex 465 and Black Pearl 3700, both from Cabot Corporation) with a Pd containing citrate colloid and reducing the Pd with hydrogen as described in U.S. Pat. No. 5,338,531. A commercial catalyst containing 5.2% by weight of Pd on carbon (Johnson Matthey, Type 39, batch 19) was used as a reference. The kinetics and the selectivity for the catalysts were compared by preparing hydrogen peroxide in an autoclave with 40 ml aqueous reaction medium containing catalyst particles in an amount corresponding to 0.09 g Pd per liter solution, which medium was agitated at 1700 rpm. The reaction medium also contained 1% by weight sulfuric acid and 5 ppm NaBr. Hydrogen and oxygen were fed to keep a pressure of 97 bars and a hydrogen concentration of about 3% by volume in the autoclave head space. The temperature was 35° C. Each catalyst test was performed as a number of batchruns with batch tines ranging between 3 and 16 hours. After each batch run, the catalyst was separated from the formed peroxide by filtration and returned to the autoclave for reuse without make up of fresh catalyst.

The total weight increase and the final hydrogen peroxide concentration were determined and the selectivity was calculated according to the formula:

% selectivity=$n_p/(n_p+n_w)$ where $n_p$ and $n_w$ represent formed moles of hydrogen peroxide and water respectively.

For the Cabot carriers, the size of the palladium crystallites were determined using X-ray diffraction and transmission electron microscopy. All other data were determined from the suppliers.

The results appear in the table below:

| Support | Elftex 465 | Black Pearl 3700 | Johnson Matthey 5.2 wt % Pd, Type 39/Batch 19* |
|---|---|---|---|
| BET area of support (m²/g) | 84 | 43 | 950 |
| % pore vol. > 10 (nm) | 50 | 98 | 66 |
| Equiv. Pd diam. (nm) | 8–15 | 8–15 | 1–2 |
| Pd surface (m²/liter soln.) | 3–6 | 3–6 | 22–45 |
| Avg. selectivity (%) | 69 | 73 | 64 |
| Avg. production (g $H_2O_2$/l, h | 7.4 | 8.9 | 8.0 |
| Avg. final conc. $H_2O_2$ (wt %) | 7.6 | 8.5 | 6.9 |

*Comparative example

The results clearly show that decreasing BET area promotes the selectivity despite higher final peroxide concentration. It is also surprisingly found, that the activity in terms of produced hydrogen peroxide per liter and hour is not proportional to the total palladium surface exposed.

I claim:

1. A method of producing hydrogen peroxide by direct reaction between hydrogen and oxygen in an aqueous reaction medium comprising contacting hydrogen and oxygen with a catalyst suspended into the reaction medium, the catalyst comprising a catalytically active surface material deposited on a support of porous silica, alumina or non-fluorinated carbon having a BET surface less than about 150 m²/g, wherein pores with a diameter exceeding about 10 nm constitute more than about 50% of the total pore volume.

2. A method as claimed in claim 1 wherein the BET surface of the support is less than about 100 m²/g but exceeds about 10 m²/g.

3. A method as claimed in claim 1, wherein the support material is non-fluorinated carbon.

4. A method as claimed in claim 1, wherein the surface area of the catalytically active material is from about 25 to about 500 m²/g.

5. A method as claimed in claim 1, wherein the catalytically active material comprises one or more precious metals selected from the group consisting of group VIII metals and gold.

6. A method as claimed in claim 1, wherein the catalytically active material is a mixture of from about 90 to 100% by weight of palladium and from 0 to about 10% by weight of platinum.

7. A method as claimed in claim 1, wherein the step of contacting hydrogen and oxygen with a catalyst comprises contacting the hydrogen and oxygen with a catalyst deposited on a support wherein pores with a diameter exceeding about 20 nm constitute more than about 50% of the total pore volume.

8. A method as claimed in claim 1, wherein the step of contacting hydrogen and oxygen with a catalyst comprises contacting the hydrogen and oxygen with a catalyst deposited on a support wherein pores with a diameter exceeding about 10 nm constitute more than about 80% of the total pore volume.

9. A method as claimed in claim 1, wherein the step of contacting hydrogen and oxygen with a catalyst comprises contacting the hydrogen and oxygen with a catalyst deposited on a support wherein pores with a diameter exceeding about 20 nm constitute more than about 80% of the total pore volume.

10. A method as claimed in claim 1, wherein the step of contacting hydrogen and oxygen with a catalyst comprises contacting the hydrogen and oxygen with a catalyst comprising from about 0.1 to about 10% by weight of catalytically active material.

* * * * *

UNITED STATES PATENT AND TRADEMARK OFFICE
CERTIFICATE OF CORRECTION

PATENT NO. : 5,961,948
DATED : Oct. 5, 1999
INVENTOR(S) : Johan Wanngard

It is certified that error appears in the above-identified patent and that said Letters Patent are hereby corrected as shown below:

On page 1, the following information is added:

[30]   Foreign Application Priority Data
   June 24, 1996   [SE]   Sweden ........................ 9602484-9

Signed and Sealed this

Twenty-seventh Day of June, 2000

*Attest:*

Q. TODD DICKINSON

*Attesting Officer*   Director of Patents and Trademarks